United States Patent [19]

Zangenfeind et al.

[11] 4,004,724

[45] Jan. 25, 1977

[54] APPARATUS FOR REMOVING EXPOSED FILMS AND BACKING STRIPS FROM CONTAINERS

[75] Inventors: Helmut Zangenfeind, Puchheim; Gerhard Küstner, Munich, both of Germany

[73] Assignee: AGFA-Gevaert, A.G., Leverkusen, Germany

[22] Filed: Jan. 26, 1976

[21] Appl. No.: 652,107

[30] Foreign Application Priority Data

Jan. 29, 1975 Germany .......................... 2503577

[52] U.S. Cl. .................................................. 226/91

[51] Int. Cl.² ........................................... G03B 1/56

[58] Field of Search ............... 226/91, 92; 352/157, 352/158; 354/212

[56] References Cited

UNITED STATES PATENTS

| | | | |
|---|---|---|---|
| 3,780,922 | 12/1973 | Bloemendaal | 226/92 |
| 3,921,878 | 11/1975 | Zangenfeind | 226/91 |
| 3,931,920 | 1/1976 | Hellinger | 226/91 |

*Primary Examiner*—Richard A. Schacher
*Attorney, Agent, or Firm*—Peter K. Kontler; John Kurucz

[57] ABSTRACT

Apparatus for withdrawing exposed photographic roll film from a container wherein the film is adjacent a backing strip and the leader of the strip extends beyond the leader of the film. The container is mounted in a locating device so that a small opening in the rear wall of the container is located in the path of a pusher which, when pivoted forwardly expels the leader of the strip through the exposure opening of the container and into the nip of two rolls which advance the strip and thereby draw the leader of the film from the container. The leader of the film is intercepted and deflected by a deflector so that the film advances in an elongated channel and is engaged and moved forwardly by second advancing rolls. The inlet of the channel is defined by the deflector and a small idler roller which is mounted between the deflector and an edge forming part of the container and bounding a portion of the exposure opening. The roller holds the leader of the film against curling between the edge and the inlet of the channel, and the roller further insures that the emulsion-coated side of the film does not bear against and is not defaced by the edge when the film moved forwardly by the second rolls. The leader of the film is held against curling and/or folding in the channel.

16 Claims, 3 Drawing Figures

APPARATUS FOR REMOVING EXPOSED FILMS AND BACKING STRIPS FROM CONTAINERS

CROSS-REFERENCE TO RELATED INVENTION

The apparatus of the present invention constitutes an improvement over and a further development of apparatus disclosed in commonly owned U.S. Lets. Pat. No. 3,921,878 granted Nov. 25, 1975 to Helmut Zangenfeind.

BACKGROUND OF THE INVENTION

The present invention relates to apparatus for removing exposed photographic roll films from the casings of containers or cassettes of the type wherein the film is located in front of a backing strip consisting of paper or the like and is expelled from the takeup section of the casing in response to withdrawal of the backing strip through an exposure opening which is provided in a flat intermediate section or bridge of the container. More particularly, the invention relates to improvements in film removing apparatus of the type disclosed in the commonly owned Lets. U.S. Pat. No. 3,921,878 to Zangenfeind.

Zangenfeind discloses an apparatus wherein one end of the backing strip in the properly located casing of a container for exposed photographic film is expelled from the intermediate container section by way of the exposure opening in response to forward movement of a pivotable pusher which enters the intermediate section by way of a second opening which permits observation of indicia applied to the rear side of the backing strip and serving to enable the user of a camera to determine the number of exposed or unexposed film frames in the container. When the pusher performs a forward stroke, the leader of the backing strip is caused to enter the nip of two advancing rolls which are driven to draw the backing strip from the takeup section of the container whereby the leader of the film emerges from the takeup section, is separated from the backing strip by a deflector and enters a channel to advance toward the nip of a second pair of driven advancing rolls which transport the film toward a further processing station, e.g., toward a splicing device which attaches the leader of the film to the trailing end of a preceding film.

It has been found that, when the leader of an exposed film exhibits a strong tendency to curl, it is likely to curl upstream of the deflector so that it does not enter the channel which leads toward the nip of the film advancing rolls. It has also been found that, when the leader of the film exhibits no tendency to curl, it is likely to bypass the deflector and to advance toward the nip of the advancing rolls for the backing strip. Moreover, the emulsion-coated side of exposed film is likely to be scratched or otherwise damaged by the customary edge which is defined by the intermediate section of the container at that end of the exposure opening in the intermediate section which is adjacent to the takeup section.

SUMMARY OF THE INVENTION

An object of the invention is to provide an apparatus which can remove exposed photographic roll films from successive film containers or cassettes in such a way that the emulsion-coated sides of films are not likely to be defaced or otherwise damaged, and which can also insure that the leader of the film invariably enters the film channel irrespective of the extent to which the leader of exposed film tends to curl.

Another object of the invention is to provide an apparatus of the just outlined character wherein the leader of the film cannot enter (or is unlikely to enter) the path for the backing strip and wherein any scratching of or other damage to emulsion-coated side of the film is prevented in a simple, inexpensive and space-saving manner.

A further object of the invention is to provide an apparatus which can accept commercially available containers for exposed photographic films and which can be installed and used in existing processing plants wherein exposed photographic films are developed, copied and assembled with prints for shipment to dealers and/or customers.

An additional object of the invention is to provide a film removing apparatus which prevents clogging of the film channel by exposed photographic film upstream as well as downstream of the customary deflector means which serves to separate the leader of the film from the backing strip.

The invention is embodied in an apparatus for removing convoluted exposed photographic films and backing strips from containers or cassettes of the type wherein a preferably plastic casing of the container is provided with registering first and second openings, wherein at least the leader of the backing strip is located between the two openings when the container is to be relieved of exposed film, wherein the casing has a preferably flat rear wall which is formed with one of the openings and wherein the leader of the backing strip is disposed between the rear wall and the other opening of the casing.

The apparatus comprises a pusher which is pivotable or otherwise movable forwardly and backwards along a predetermined path, locating means including one or more stops for suitable projections of the casing and arranged to support a casing in such position that the openings of the casing are located in the path for the pusher whereby the pusher passes, during forward movement thereof, first through the one opening and thereupon through the other opening of the casing which is supported by the locating means and expels the leader of the backing strip from the casing by way of the other opening, first advancing means (e.g., two rolls one of which is driven and the other of which is biased toward the one roll) disposed behind the other opening of the casing which is supported by the locating means and serving to automatically engage the expelled leader of the backing strip and to advance the thus engaged backing strip lengthwise to thereby draw the leader of the film from the casing through the intermediary of the backing strip, film advancing means located behind and spaced apart from the other opening of the casing which is supported by the locating means, a film channel having an inlet adjacent to the other opening and an outlet adjacent to the film advancing means, the maximum width of the channel being such that the leader of the film therein is held against curling or folding, a main deflector or analogous means for separating the film from the backing strip and including a portion (e.g., the tip of a wedge-like main deflector) which is disposed at one side of the inlet of the film channel and is closely adjacent to but still spaced from the rear wall of the casing which is supported by the locating means so as to deflect the oncoming leader of the film when the leader of the film reaches the tip of the separating means whereby such leader enters the inlet of the film channel and moves into the range of the film advancing means in response to lengthwise movement of backing strip under the action of the first advancing means, and a relatively small roller or an analogous auxiliary deflector located at the other side of the inlet of the film channel opposite the separating means to prevent curling of the leader of photographic film before the leader of the film reaches the separating means during withdrawal of the backing strip from the casing which is supported by the locating means.

The casing of each film container has a substantially straight edge which bounds a portion of the other opening (the other opening is preferably the exposure opening of the casing). The aforementioned auxiliary deflector is preferably positioned between the edge and the tip of the separating means so that it prevents curling of the leader of photographic film immediately downstream of the edge, i.e., the auxiliary deflector insures that the leader of the film advances therebeyond and can be engaged by the tip of the separating means in order to enter the inlet of the film channel. The tip of the separating means is sufficiently close to the rear wall of the casing (i.e., to the front side of the backing strip) to thus insure that the leader of the film is invariably steered into the inlet of the film channel. The auxiliary deflector may be mounted for rotation about a fixed axis, or it may be biased toward the rear wall of the casing which is supported by the locating means of the apparatus.

The novel features which are considered as characteristic of the invention are set forth in particular in the appended claims. The improved apparatus itself, however, both as to its construction and its mode of operation, together with additional features and advantages thereof, will be best understood upon perusal of the following detail description of certain specific embodiments with reference to the accompanying drawing.

DESCRIPTION OF THE PREFERRED EMBODIMENTS

Figure 1:
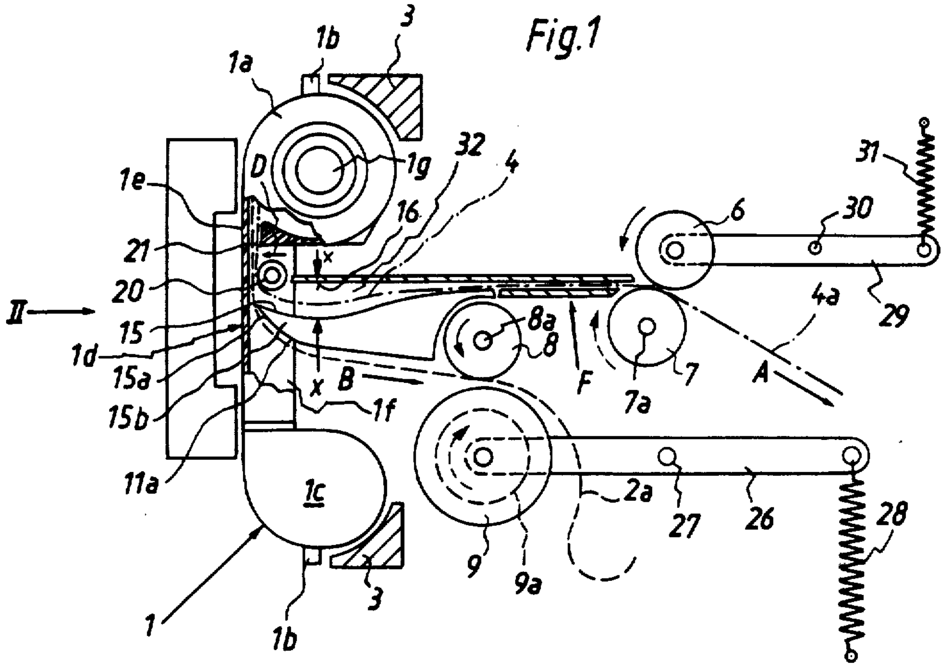
FIG. 1 is a schematic partly elevational and partly vertical sectional view of an apparatus which embodies one form of the invention, the casing of a container for photographic film being shown in a position it assumes during withdrawal of exposed film from its takeup section.

FIG. 1 shows a container or cassette 1 having a casing consisting of suitable synthetic plastic material and including a substantially cylindrical supply section 1*c*, a substantially cylindrical takeup section 1*a*, and a relatively thin intermediates section or bridge 1*d*. The section 1*a* contains a takeup reel l*g* which can be rotated by the film transporting mechanism of a camera (not shown) when the container is properly inserted into the camera body so that the section 1*a* collects successive exposed frames of the photographic roll film 4. The film 4 is located in front of a backing strip 2 which is made of paper or the like. The intermediate section 1*d* has an exposure opening 23 (FIG. 2) in register with a relatively small second opening 24. The exposure opening 23 is located between two spaced-apart parallel side walls or flanges 1*f* of the intermediate section 1*d*, and the opening 24 is provided in the rear wall or panel 1*e* of the section 1*d*. When the casing of the container 1 is properly installed in the body of a still camera and the shutter of the camera is caused to open, light entering by way of the picture taking lens of the camera exposes that film frame which is in register with the opening 23. The film transporting mechanism of the camera is thereupon actuated to advance the film in order to move the next-following (foremost) unexposed film frame into register with the opening 23.

The purpose of the opening 24 is to permit observation of customary numbers or other suitable indicia (not shown) at the rear side of the backing strip 2; such indicia represent the number of exposed or unexposed film frames in the container 1. In addition, and as disclosed in the aforementioned Lets. U.S. Pat. No. 3,921,878 to Zangenfeind, the opening 24 enables a pusher 25 (shown in FIG. 2) to enter the intermediate section 1*d* from behind when the casing of the container 1 (with a roll of exposed photographic film 4 convoluted in the takeup section 1*a*) is mounted in a manner as shown in FIG. 1. The pusher 25 enters the opening 24 and causes the leader 2*a* of the backing strip 2 to pass through the exposure opening 23 and into the nip of two advancing rolls 8, 9 which are located behind the opening 23. The advancing roll 8 is rotatable about the fixed axis of a drive shaft 8*a* which is journalled in the frame F of the apparatus. The roll 9 is mounted on one arm of a two-armed lever 26 which is fulcrumed at 27 and the other arm of which is attached to a helical spring 28 serving to urge the roll 9 upwardly, as viewed in FIG. 1. The peripheral surface of the roll 9 has a circumferential groove 9*a* which receives the front end portion of the pusher 25 when the latter assumes its foremost position corresponding to that of the pusher 5 shown in FIG. 1 of Letters Patent to Zangenfeind. This insures that the leader 2*a* of the backing strip 2 is engaged by the peripheral surfaces of the advancing rolls 8, 9 and the rolls thereupon draw the backing strip from the takeup section 1*a* of the container 1.

The improved apparatus comprises suitable stops 3 which cooperate with customary projections or ribs 1*b* of the sections 1*a*, 1*c* to insure that the casing of the container 1 is maintained in a predetermined position (shown in FIG. 1) in which the openings 23, 24 of the intermediate section 1*d* are located in the path of movement of the pusher 25. The stops 3 of FIG. 1 constitute but two elements of the means for locating the casings of successive containers 1 in a predetermined position. Reference may be had to the Letters Patent to Zangenfeind which shows additional elements of such locating means.

The frame F further supports a wedge-like main deflector or separating means 15*a* which extends into the space between the flanges 1*f* of the intermediate section 1*d* when the casing of the container 1 is properly installed in the locating means including the stops 3. The arrangement is preferably such that the leftmost portion or tip of the main deflector 15*a* is spaced apart from the adjacent front side or surface of the rear wall 1*e* of the intermediate section 1*d* when the casing of the container 1 assumes the predetermined position of FIG. 1. The minimum distance between the tip of the main deflector 15*a* and the front side of the rear vall 1*e* may be a multiple of the thickness of the film 4, e.g., five times the thickness of the film.

Still further, the frame F of the improved apparatus supports two advancing rolls 6, 7 which serve to transport the film 4 toward a splicing mechanism or the like, not shown, where the leader 4*a* of the film 4 is attached to the trailing end of the preceding film. Such mode of connecting several exposed films end-to-end is customary in modern developing apparatus wherein a web consisting of a large number of films is caused to pass through a series of developing stations and thereupon through a series of printing and other processing stations. The lower advancing roll 7 for the film 4 is preferably driven (by the shaft 7*a*) in such a way that its peripheral speed matches or very closely approximates the peripheral speeds of advancing rolls 8, 9 for the backing strip 2. The upper advancing roll 6 for the film 4 is mounted on one arm of a two-armed lever 29 which if fulcrumed at 30 and the other arm of which is biased by a helical spring 31 so that the roller 6 normally bears against the driven roller 7.

Figure 2:
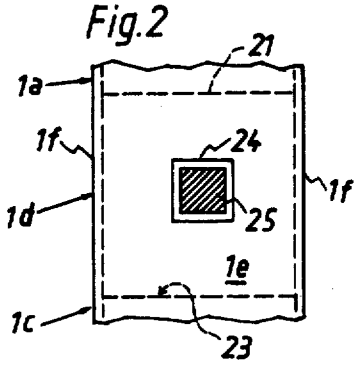
FIG. 2 is a fragmentary end elevational view of the container as seen in the direction of arrow II in FIG. 1, further showing a portion of a pivotable pusher which can expel the backing strip from the container.

In the embodiment of FIGS. 1 and 2, the main deflector 15*a* forms an integral or separable part of a stationary member 15*b* which is fixedly but preferably removably installed in the frame F and has a wall 15 cooperating with a stationary wall 16 to define therewith an elongated film channel 32 wherein the leader 4*a* of the film 4 advances toward the nip of the rolls 6, 7. In accordance with a feature of the invention, the maximum width (*x*—*x*) of the film channel 32 is selected with a view to insure that the leader 4*a* of the film 4 cannot curl, fold or reverse the direction of its movement in the channel 32 even if such leader exhibits a very pronounced tendency to curl. The inlet of the channel 32 is located in the space between the flanges 1*f* of the intermediate section 1*d* of the casing of a properly located container 1, and the outlet of the channel 32 is adjacent the nip of the rolls 6, 7. A second film channel (not shown) may be provided downstream of the advancing rolls 6, 7 to guide the leader 4*a* of the film 4 on its way toward the aforediscussed splicing mechanism. The main deflector 15*a* the foremost (left-hand end) portion of the wall 15 of the stationary member 15*b*, i.e., this main deflector is installed at one side of the inlet of the channel 32 and is immediately adjacent the exposure opening 23 between the flanges 1*f*.

An advantage of the feature that the maximum width (*x*—*x*) of the film channel 32 is selected with a view to prevent curling of the leader 4*a* of film 4 in this channel is that the film cannot clog the channel 32 during withdrawal from the casing of the container 1 and/or that the leader 4*a* of the film cannot reverse the direction of its movement so that it would move backwards (toward the exposure opening 23) in response to withdrawal of backing strip 2 by means of the advancing rolls 8 and 9.

A further feature of the improved apparatus resides in the provision of an auxiliary deflector here shown as a relatively small idler roller 20 which is mounted in the frame F in such position that it is disposed in the space between the flanges 1*f* when the casing of the container 1 is properly located in the position shown in FIG. 1. The mounting of the idler roller 20 is such that an extension of the plane including the underside of the wall 16 of the film channel 32 is substantially tangential to its peripheral surface. The roller 20 is located at the inlet of the film channel 32 (opposite the main deflector 15*a*) and at a relatively short distance from a straight horizontal edge 21 which is defined by the intermediate section 1*d* and constitutes the upper boundary of the exposure opening 23. The roller 20 is mounted with a view to insure that, when the film 4 is being withdrawn by the advancing rolls 6 and 7, the film passes from the interior of the takeup section 1*a*, around the roller 20 and into the inlet of the channel 32 without touching the edge 21. This insures that the edge 21 cannot scratch or otherwise deface or damage the emulsion-coated side of the film 4. The distance between the periphery of the idler roller 20 and the edge 21 is sufficiently small to insure that the leader 4*a* of the film 4 cannot enter the space between these parts, i.e., the leader 4*a* is compelled to enter the inlet of the channel 32 when the advancing rolls 8, 9 draw the backing strip 2 from the takeup section 1*a*. Such movement of the backing strip 2 is shared by the film 4 whose leader 4*a* thus emerges from the takeup section 1*a* and enters the channel 32 to advance toward the nip of the rolls 6, 7 by sliding along the adjacent surface of the wall 15 or 16.

The member 15*b* has a guide surface 11*a* along which the backing strip 2 moves when the pusher 25 performs a forward stroke toward the groove 9*a* of the spring-biased advancing roll 9. When the casing of a container 1 is mounted in the apparatus in a manner as shown in FIG. 1, the trailing end (2*a*) of the backing strip 2 is normally located in the interior of the supply section 1*c*, i.e., a portion of the backing strip extends between the openings 23, 24 so that it is located in the path of forward movement of the pusher 25. Such trailing end 2*a* of the backing strip 2 becomes the leader when the pusher 25 completes its forward stroke so that the backing strip is engaged and entrained by the rolls 8 and 9. The leader 4*a* of the film 4 does not extend into the supply section 1*c*; such leader of the film will be expelled from the container 1 via exposure opening 23 not later than when the rolls 8, 9 begin to advance the backing strip 2 in the direction indicated by arrow B.

The distance between the rear wall 1*e* and the roller 20 may equal the distance between the tip of the main deflector 15*a* and the rear wall 1*e*, i.e., such distance may be a multiple of the thickness of a film 4.

The exposed upper surface of the wall 15 is preferably horizontal or nearly horizontal so that at least a portion of such surface is normal or substantially normal to the plane of the preferably vertical rear wall 1*e*. In other words, the angle between the upper surface of the wall 15 (which is preferably located at a level above the guide surface 11*a* for the backing strip 2) and a horizontal plane is preferably a small acute angle.

The configuration of the peripheral surface of the roll 8 and the manner of moving the pusher 25 forwardly and backwards may be the same as disclosed and shown in the Letters Patent to Zangenfeind.

The operation is as follows:

The casing of a container 1 with exposed photographic film 4 therein is mounted in the apparatus in a manner as shown in FIG. 1 so that the exposure opening 23 of its intermediate section 1*d* faces toward the member 15*b*, and the main deflector 15*a* and idler roller 20 enter the space between the flanges 1*f* of the section 1*d*. The pusher 25 is held in the retracted position and is thereupon pivoted forwardly (in a manner as shown in the Letters Patent to Zangenfeind) whereby it enters the intermediate section 1*d* via opening 24 and expels the adjacent portion of the backing strip 2 through the exposure opening 23. The pivoting pusher 25 causes the leader 2*a* of the backing strip 2 to enter the nip of the rolls 8, 9. The roll 8 is constantly driven (by shaft 8*a*) at a fixed speed so that the rolls 8, 9 engage and entrain the backing strip 2 which begins to move lengthwise in the direction indicated by arrow B and is thereby withdrawn from the takeup section 1*a* of the container 1. The advancing backing strip 2 bears against the suitably curved guide surface 11*a* of the member 15*b* and the tip of the main deflector 15*a* bears against the right-hand side of the backing strip.

The film 4 is compelled to share the lengthwise movement of backing strip 2 which is being withdrawn by the advancing rolls 8, 9 so that the leader 4*a* of the film 4 emerges from the takeup section 1*a*, advances downwardly along the edge 21, thereupon along the left-hand side of the idler roller 20 and is intercepted by the tip of the main deflector 15*a* so that it enters the inlet of the film channel 32. The leader 4*a* of the film 4 is not attached (or need not be attached) to the backing strip 2. It is not absolutely necessary that the leader 4*a* of the film 4 be engaged and deflected by the main deflector 15*a*; thus, if the leader 4*a* exhibits a sufficient tendency to curl, it will automatically enter the inlet of the film channel 32 between the roller 20 and main deflector 15*a* as soon as its advances downwardly beyond the roller 20. The leader 4*a* of the film 4 advances in the channel 32 and enters the nip of the rolls 6, 7 to be transported toward the splicing mechanism. The peripheral speed of the rolls 6, 7 equals or closely approximates that of the rolls 8, 9 so that the speed of lengthwise movement of the film 4 toward the splicing station (arrow A in FIG. 1) equals the speed of lengthwise movement of the backing strip 2 in the direction indicated by arrow B.

When the leader 4*a* of the film 4 enters the nip of the advancing rolls 6, 7, its speed increases so that the tension of the film increases between the nip of the rolls 6, 7 and the takeup section 1*a*. Consequently, the film 4 bears against the idler roller 20 and is thereby held out of contact with the edge 21 of the intermediate section 1*d*.

The improved apparatus is susceptible of many modifications without departing from the spirit of the invention. For example, the wall 15, the main deflector 15*a* and the guide surface 11*a* need not constitute component parts of a one-piece member 15*b*, i.e., the main deflector 15*a* may constitute a discrete element, the wall 15 may constitute a discrete element, the surface 11*a* may be provided on a discrete element, the wall 15 may be a part separate from a second part including 15*a* and 11*a*, the main deflector 15*a* may be a part separate from a second part including 15 and 11*a*, or the surface 11*a* may be provided on a part separate from a discrete second part including 15 and 15*a*. Furthermore, and as shown in FIG. 1, the upper side or surface of the wall 15 and/or the guide surface 11*a* may be suitably curved (each thereof may be partly concave and partly convex) so as to insure an optimum guidance of film 4 toward the nip of the rolls 6, 7 and/or an optimum guidance of backing strip 2 toward the nip of the rolls 8, 9, i.e., the configuration of such sides or surfaces may conform to the dynamic progress of withdrawal of film and/or backing strip from the casing of a properly located container.

Figure 3:
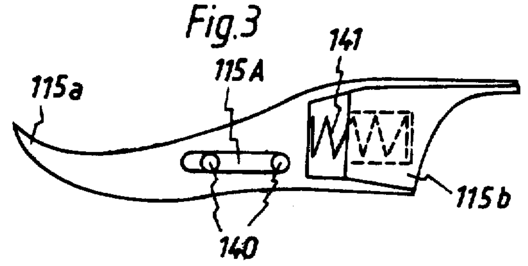
FIG. 3 is a schematic elevational view of a portion of a modified apparatus.

FIG. 3 shows a further modification. The main deflector 115*a* forms a discrete part which is formed with an elongated slot 115A for guide pins 140 and is biased forwardly by a helical spring 141 reacting against a stationary back support 115*b* of the frame. The length of the slot 115A and the positions of pins 140 are selected with a view to insure that the tip of the main deflector 115*a* is located at a predetermined distance from the adjacent side of the rear wall 1*e* (not shown) of the intermediate section 1*d* of the casing of a properly located container 1. In each instance, the width of the main deflector 15*a* or 115*a* (as viewed at right angles to the plane of the drawing) is preferably at least slightly less than the distance between the flanges 1*f* of an intermediate section 1*d*.

The idler roller 20 may be mounted for rotation about a fixed axis. Alternatively, the apparatus may comprise a weak helical spring or other suitable means for biasing the roller 20 in the direction indicated by arrow D, i.e., toward the front side of that portion of the backing strip 2 which is disposed in front of the rear wall 1*e* of the intermediate section 1*d*.

An important advantage of the improved apparatus is that the tip of the main deflector 15*a* or 115*a* invariably separates the leader 4*a* of the film 4 from the front side of the backing strip 2 even if the leader 4*a* exhibits little or no tendency to curl, i.e., even if the leader 4*a* is straight or practically straight. This is due to the fact that the tip of the main deflector 15*a* or 115*a* is closely adjacent to the rear wall 1*e* of the intermediate section 1*d* when the casing of the respective container 1 is properly supported by the locating means including the stops 3.

The width of the channel 32 may be constant all the way from its inlet between the roller 20 and the tip of the main deflector 15*a* to the outlet of the channel 32 immediately upstream of the nip of the film advancing rolls 6, 7. Alternatively, and as shown in FIG. 1, the width of the channel 32 may vary between its inlet and outlet; in each instance, the maximum width ($x—x$) is selected with a view to prevent curling or folding of the leader 4*a* on its way from the opening 23 toward the nip of the rolls 6 and 7. The roller 20 or an analogous auxiliary deflector performs the important function of preventing the emulsion-coated side of the film 4 from sliding along and from being scratched or otherwise defaced by the edge 21 of the intermediate section 1*d*. Also, the roller 2 insures that the leader 4*a* invariably reaches the inlet of the film channel 32.

Without further analysis, the foregoing will so fully reveal the gist of the present invention that others can, by applying current knowledge, readily adapt if for various applications without omitting features which fairly constitute essential characteristics of the generic and specific aspects of the aforedescribed contribution to the art and, therefore, such adaptations should and are intended to be comprehended within the meaning and range of equivalence of the claims.

What is claimed is:

1. Apparatus for removing convoluted films and backing strips from containers of the type wherein a casing of the container is provided with registering first and second openings, at least the leader of the backing strip is located between the openings, the casing has a wall which is formed with one of said openings and the leader of the backing strip is disposed between said wall and the other of said openings, comprising a pusher movable forwardly and backwards along a predetermined path; locating means arranged to support the casing of a container in such position that the openings of the casing are located in said path whereby said pusher passes, during the forward movement thereof, first through said one opening and thereupon through said other opening of the casing which is supported by said locating means and expels the leader of the backing strip through said other opening; first advancing means located behind said other opening of the casing which is supported by said locating means and arranged to engage the expelled leader of the backing strip and to advance the thus engaged backing strip lengthwise to thereby draw the film from the casing through the intermediary of the backing strip; film advancing means located behind and spaced apart from said other opening of the casing which is supported by said locating means; a film channel having an inlet adjacent to said other opening and an outlet adjacent to said film advancing means; means for separating the film from the backing strip including a portion disposed at one side of said inlet and being closely adjacent but spaced from said wall of the casing which is supported by said locating means so as to deflect the oncoming leader of the film when said last mentioned leader reaches said portion of said separating means so that the leader of the film enters said inlet and moves into the range of said film advancing means in response to transport of the backing strip by said first advancing means, the maximum width of said channel being such that the leader of the film therein is held against curling or folding during movement toward said film advancing means; and an auxiliary deflector located at the other side of said inlet opposite said separating means to prevent curling of the leader of the film before such leader reaches said separating means during withdrawal of the backing strip from the casing which is supported by said locating means.

2. Apparatus as defined in claim 1 for removing convoluted films and backing strips from containers of the type wherein the casing of the container is provided with an edge bounding a portion of said other opening, wherein said auxiliary deflector includes a roller which is disposed between said portion of said separating means and the edge of the casing which is supported by said locating means.

3. Apparatus as defined in claim 1, wherein said film channel includes a wall extending from said portion of said separating means to said film advancing means.

4. Apparatus as defined in claim 1, wherein each of said advancing means comprises a pair of rolls, means for driving at least one of said rolls and means for biasing one roll of at least one of said advancing means toward the other roll of the respective advancing means.

5. Apparatus as defined in claim 1, further comprising a member having a guide surface along which the backing strip moves toward said first advancing means in response to forward movement of said pusher and a wall extending from said separating means toward said film advancing means, said last mentioned wall forming part of said film channel and said separating means forming part of said member.

6. Apparatus as defined in claim 5, wherein said guide surface is curved to conform to dynamic progress of the backing strip when the latter is expelled from the casing in response to forward movement of said pusher.

7. Apparatus as defined in claim 5, wherein said wall of said member has a surface with a curvature which conforms to the dynamic progress of the leader of the film during movement of film in said channel toward said film advancing means.

8. Apparatus as defined in claim 5, wherein said wall of said member is located at a level above said guide surface.

9. Apparatus as defined in claim 1, further comprising means for biasing said portion of said separating means toward the rear wall of the casing which is supported by said locating means.

10. Apparatus as defined in claim 1 for removing convoluted films having a predetermined thickness, further comprising means for maintaining said portion of said separating means at a predetermined distance for the rear wall of the casing which is supported by said locating means, said distance being a multiple of said predetermined thickness.

11. Apparatus as defined in claim 10 for removing convoluted films and backing strips from containers of the type wherein the casing of the container has an intermediate portion which is provided with said openings and includes two spaced-apart parallel side walls extending forwardly from said rear wall thereof and flanking said other opening, the width of said portion of said separating means being at least slightly less than the distance between the side walls of the casing which is supported by said locating means.

12. Apparatus as defined in claim 11, wherein said rear wall of the casing which is supported by said locating means is substantially vertical and said channel has a wall extending from said portion of said separating means toward said film advancing means, said wall of said channel having a film guiding surface at least a portion of which is at least substantially horizontal.

13. Apparatus as defined in claim 1 for removing films having a predetermined thickness, wherein said auxiliary deflector is disposed at a predetermined distance from the rear wall of the casing which is supported by said locating means, said distance being a multiple of said predetermined thickness.

14. Apparatus as defined in claim 13 for removing films and backing strips from containers of the type wherein the casing of the container has an elongated edge bounding a portion of said other openings, said auxiliary deflector comprising a small-diameter idler roller disposed between said portion of said separating means and said edge and being sufficiently close to the edge of a casing which is supported by said locating means to prevent entry of the leader of the film between said edge and said roller, even if the leader of the film exhibits a strong tendency to curl.

15. Apparatus as defined in claim 1, wherein said locating means comprises stops for projections provided on the casing of the container and the casing of the container has flanges flanking said other opening and extending from said rear wall toward said channel, said auxiliary deflector and said separating means being disposed between said flanges when the casing is supported by said locating means.

16. Apparatus as defined in claim 15, wherein said other opening of the casing is an exposure opening through which light entering by way of a picture taking lens impinges on a film frame which is in register with said other opening while the casing is installed in the body of a photographic apparatus.

* * * * *